(12) United States Patent
Fukasaku et al.

(10) Patent No.: US 6,404,086 B1
(45) Date of Patent: *Jun. 11, 2002

(54) ANISOTROPIC MAGNET BRUSHLESS MOTOR HAVING A ROTOR WITH ELASTIC INSULATING SUPPORT STRUCTURE

(75) Inventors: Yoshinori Fukasaku, Hitachi; Mitsuaki Mirumachi, Hitachinaka; Hideo Tatsumi, Mito, all of (JP)

(73) Assignees: Hitachi, Ltd., Tokyo; Hitachi Car Engineering Co., Ltd., Hitachinaka, both of (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/929,580

(22) Filed: Sep. 15, 1997

(30) Foreign Application Priority Data

Sep. 13, 1996 (JP) .............................................. 8-242902
Oct. 23, 1996 (JP) .............................................. 8-280668

(51) Int. Cl.⁷ .............................. H02K 5/00; H02K 37/00
(52) U.S. Cl. ...................... 310/89; 310/43; 310/156.08; 310/156.12; 310/49 R; 310/179
(58) Field of Search ............................ 310/89, 43, 52, 310/49 R, 91, 156, 215; 29/596–598

(56) References Cited

U.S. PATENT DOCUMENTS

| | | | | |
|---|---|---|---|---|
| 4,384,226 A | * | 5/1983 | Sato et al. ..................... | 310/89 |
| 4,528,473 A | * | 7/1985 | Tezuka ......................... | 310/89 |
| 4,579,882 A | * | 4/1986 | Kanbe et al. .................. | 523/137 |
| 4,714,850 A | * | 12/1987 | Akiba et al. ................... | 310/49 R |
| 4,841,190 A | * | 6/1989 | Matsushita et al. ........... | 310/257 |
| 5,049,770 A | * | 9/1991 | Gaeth et al. ................... | 310/51 |
| 5,204,566 A | * | 4/1993 | Borgen et al. ................. | 310/71 |
| 5,241,229 A | * | 8/1993 | Katakura et al. .............. | 310/51 |
| 5,268,607 A | * | 12/1993 | McManus ...................... | 310/89 |
| 5,287,030 A | * | 2/1994 | Nutter ........................... | 310/89 |
| 5,500,994 A | * | 3/1996 | Itaya ............................. | 29/598 |
| 5,565,719 A | * | 10/1996 | Kuhlmann ..................... | 310/47 |
| 5,650,675 A | * | 7/1997 | Kanaya et al. ................. | 310/58 |
| 5,767,596 A | * | 6/1998 | Stark et al. .................... | 310/89 |

FOREIGN PATENT DOCUMENTS

| | | |
|---|---|---|
| JP | 54-47014 | 8/1977 |
| JP | 58-22839 | 1/1981 |
| JP | 61-84658 | 6/1986 |
| JP | 1-109271 | 7/1989 |
| JP | 2-88437 | 3/1990 |
| JP | 5-344702 | 12/1993 |
| JP | 7-107692 | 4/1995 |
| JP | 7-147748 | 6/1995 |
| JP | 8-051744 | of 1996 |
| JP | 8-65932 | 3/1996 |
| JP | 8-65942 | 3/1996 |
| JP | 8-223849 | 8/1996 |

* cited by examiner

*Primary Examiner*—Tran Nguyen
(74) *Attorney, Agent, or Firm*—Crowell & Moring LLP

(57) ABSTRACT

A permanent-magnet type brushless motor has a rotor which is made by integrally forming a rotating magnetic pole comprising a cylindrical multi-pole anisotropic magnet, a shaft and an elastic insulating supporting member having rigidity lower than at least that of the shaft. The multi-pole anisotropic magnet causes its magnetic flux to flow to form the closed magnetic circuit, thereby eliminating the necessity of forming the closed magnetic circuit using an inner stator core in the magnet required for the radial anisotropic magnet. A cylindrical casing holding therein a stator core.

8 Claims, 14 Drawing Sheets

ANISOTROPIC MAGNET BRUSHLESS MOTOR HAVING A ROTOR WITH ELASTIC INSULATING SUPPORT STRUCTURE

BACKGROUND OF THE INVENTION

1. Field of the Invention

The present invention relates to a permanent-magnet type brushless motor in which a multi-pole anisotropic magnet is used for a rotor and a stator core is covered by an insulator, and to an air conditioner using the motor.

2. Description of the Prior Art

A conventional permanent-magnet type brushless motor disclosed in Japanese Patent Application Laid-Open No. 5-344702 in which a stator core is molded by using a resin and the motor disclosed in Japanese Unexamined Utility Model Publication No. 2-88437 in which a rotor is formed by integrally molding a cylindrical magnet and a shaft by inserting a resin are known.

SUMMARY OF THE INVENTION

The former known technique is effective with respect to points that the influence by noises generated from the motor is reduced and noises entering from the outside into the motor are checked, however, since the core is molded, the weight is relatively heavy. The motor is difficult to be disassembled and recyclability is not sufficiently considered.

The point of the latter known technique is to open a drill hole in the shaft in order to enhance the connecting force with the shaft when the cylindrical magnet and the shaft are molded by inserting a resin. However, suppression of the rotor vibration is not considered.

It is an object of the invention to provide an efficient permanent-magnet type brushless motor having lighter weight and higher recyclability in which lightness, improvement in assembling performance, low vibration, and the like are generally reexamined.

The one object of this invention is to supply an air conditioner with higher safety.

According to an aspect of the present invention, the object of the invention is achieved by a permanent-magnet type brushless motor having a rotor obtained by integrally forming a rotating magnetic pole constructed by a cylindrical multi-pole anisotropic magnet and a shaft by a cylindrical casing holding therein a stator core and an elastic insulating supporting member having rigidity lower than at least that of the shaft.

Preferably, the cylindrical casing is constructed by two divided cup-shaped synthetic resin members which are fixed so as to face each other while sandwiching the stator core.

Preferably, the cylindrical casing member is made of a non-magnetic material having the specific gravity at least ranging from 0.8 to 3.

Preferably, the cylindrical casing includes a material which suppresses electromagnetically radiated noises generated during operation on the basis of a rotational control frequency.

Preferably, the cylindrical casing is divided into two by an almost vertical line in the axial dimension of the rotor, a mounting flange for a rotor and a boss to be attached to the divided-half of the casing are integrally formed in the other divided-half of the casing, a loop slot is formed on one of the division faces, a projection is formed on the opposite face, and the loop slot and the projection are fit with each other and connected.

Preferably, the rotor mounting flange has a vibration damping member, and the vibration damping member comprises a thin-walled circular tube arranged in the center part and a vibration absorbing member which is closely attached to the thin-walled circular tube and has a plurality of through holes extending in the axial direction on the outer periphery.

According to another aspect of the present invention, there is provided a permanent-magnet type brushless motor having a rotor by integrally forming a rotating magnetic pole constructed by a cylindrical multi-pole anisotropic magnet and a shaft by a cylindrical casing made of a resin which holds a stator core and an elastic insulating member having rigidity lower than at least that of the shaft, wherein a stator coil wound around the stator core is of a coil insulating kind having a flash point temperature lower than that of an insulating resin member provided between the lowest layer of the coil and the stator core and that of the cylindrical resin casing.

Preferably, a lead wire of the stator coil is collected at a wiring terminal fixed to the end face of the stator coil and is led to the outside.

According to another aspect of the present invention, the invention is realized by a permanent-magnet type brushless motor comprising: a wiring terminal provided on one end face of an insulator arranged on the side face of a stator core; and an input terminal fixed to a cylindrical casing made of resin surrounding the stator core, wherein by assembling the cylindrical casing to the stator core, the wiring terminal and the input terminal are connected.

According to another aspect of the present invention, the invention is achieved by a permanent-magnet type brushless motor comprising: a wiring terminal provided on one end face of an insulator arranged on a side face of a stator core; a cylindrical casing made of a resin surrounding the stator core; and a connector which is fit and fixed on one end of the casing and in which an input terminal is embedded, wherein by assembling the connector to the cylindrical casing, the wiring terminal and the input terminal are connected.

Preferably, the same wiring terminal is used for a terminal wire of the stator coil and a neutral point connection, the wiring terminal for the terminal wire is embedded in a cavity formed on the outer periphery of the insulator and the wiring terminal on the neutral point side is embedded in a state of a series of the same terminals like a chain.

Preferably, the connector has a projection in a shape which is fit into a loop slop formed on the outer face of the casing.

According to further another aspect of the present invention, the invention is achieved by a permanent-magnet type brushless motor having a rotor obtained by integrally forming a rotor magnetic pole constructed by a cylindrical multi-pole anisotropic magnet and a shaft by a cylindrical casing made of a resin holding therein a stator core and an elastic insulating member having rigidity lower than at least that of the shaft, wherein the inner diameter of the casing into which the stator core and a bearing supporting the rotor are fit has a press-fit dimension in which the inner diameter of the casing is smaller than a reference dimension at the time of cooling when the ambient temperature is lower than approximately 70° C. and has a loose dimension in which the inner diameter of the casing is larger than the reference dimension when the ambient temperature is higher than 70° C., thereby enabling the stator core and the bearing part of the rotor to be simultaneously inserted upon assembly.

According to further another aspect of the present invention, there is provided an air conditioner using a permanent-magnet type brushless motor, wherein a softening temperature of an insulating film of a stator coil wound around a stator core is set to a value lower than a flashing point temperature of a resin material for insulation provided between the coil and the stator core and is set to a value lower than a flashing point temperature of a casing made of a resin surrounding the stator core.

DESCRIPTION OF THE PREFERRED EMBODIMENTS

Figure 1:
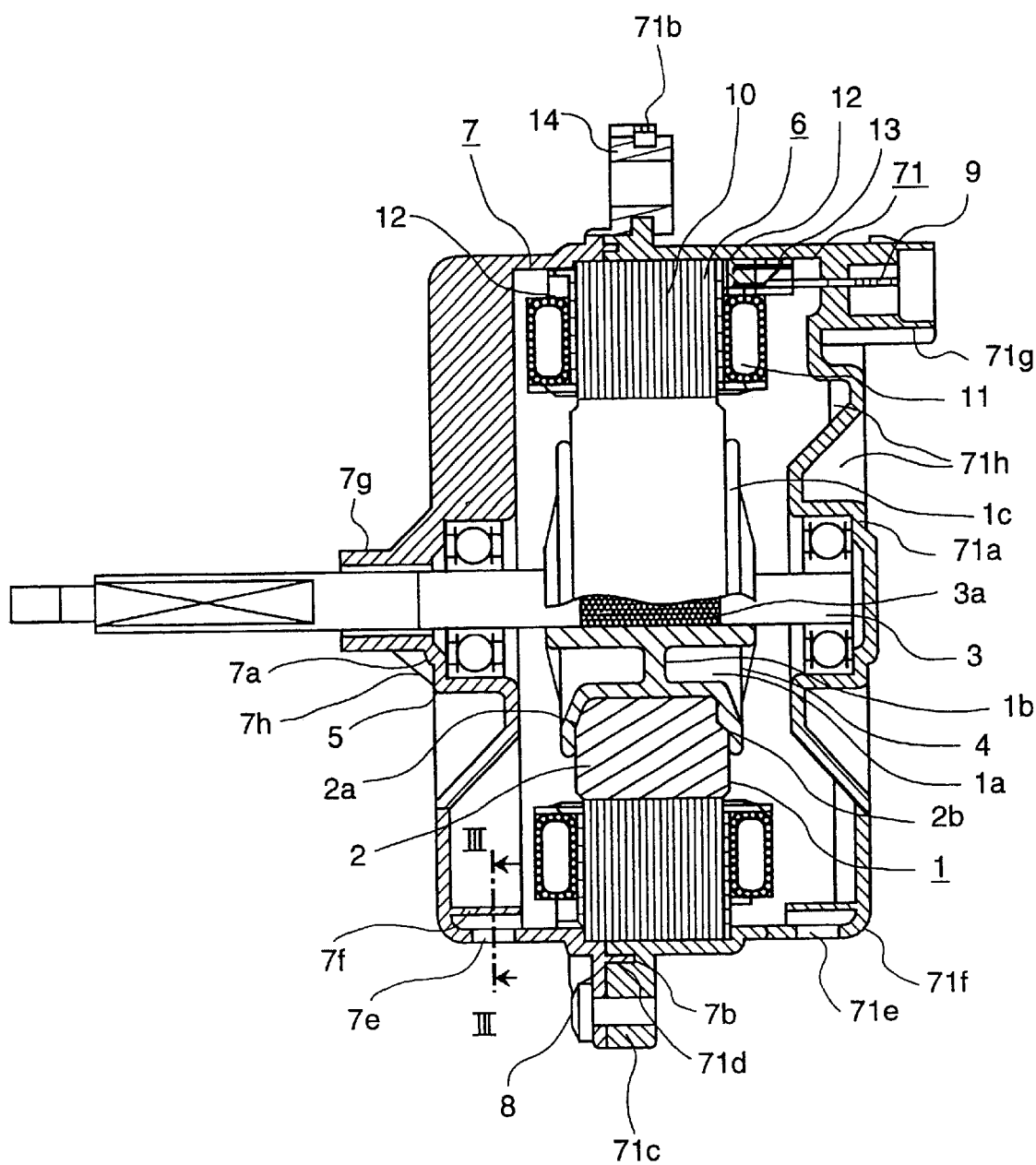
FIG. 1 is a cross section of a permanent-magnet type brushless motor according to an embodiment of the invention.
Figure 2:
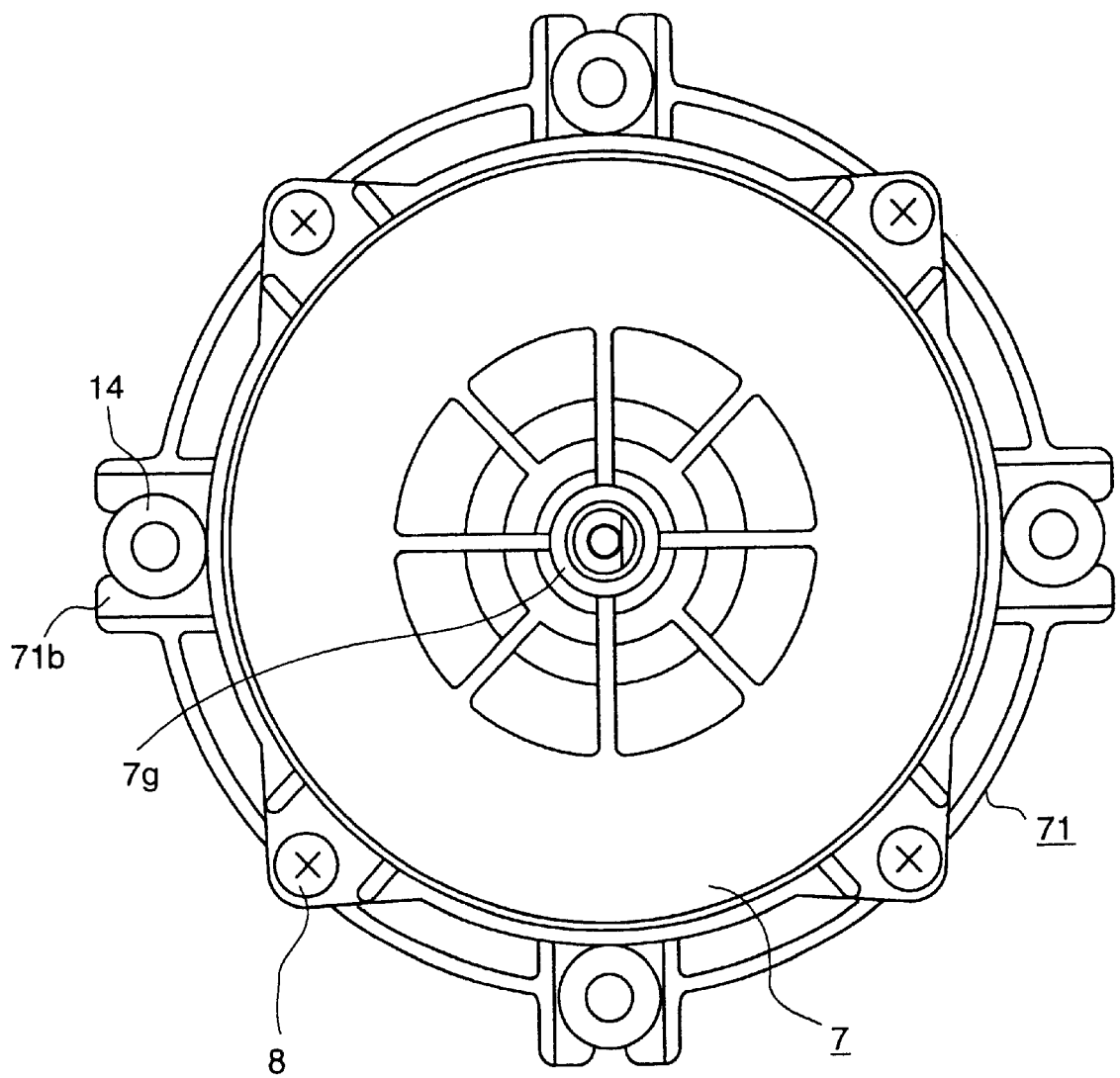
FIG. 2 is a side view of the left part of FIG. 1.

The invention will be described hereinbelow according to embodiments shown in the drawings.

Figure 8:
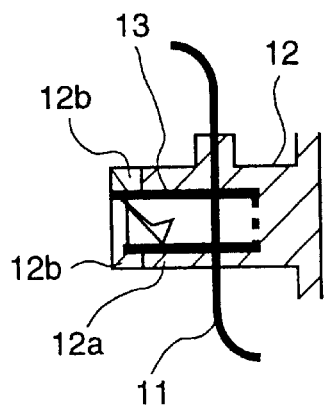
FIG. 8 is a cross section of a main part of FIG. 7.
Figure 9A:
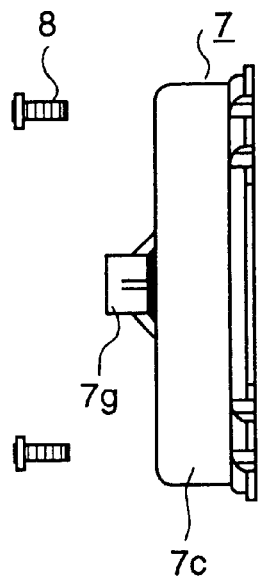
FIG. 9 is an exploded view of the permanent-magnet type brushless motor according to the embodiment of the invention.
Figure 9B:
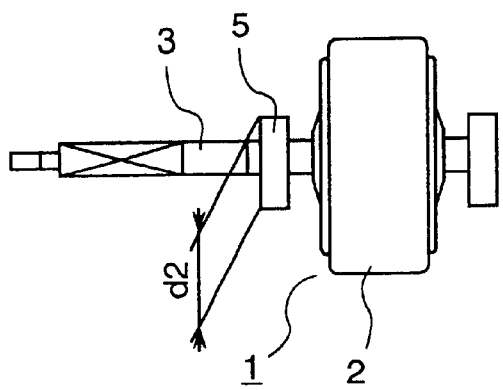
Figure 9C:
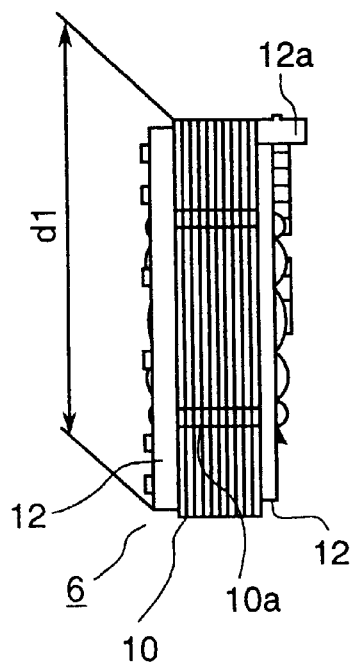
Figure 9D:
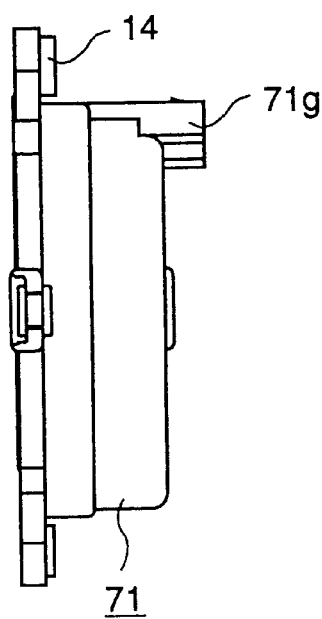

A permanent-magnet type brushless motor of the invention will be described with reference to FIGS. 1 and 8. In FIG. 1, a rotor 1 comprises a multi-pole anisotropic magnet 2 in a cylindrical shape and a shaft 3 arranged in the center of the magnet 2. The magnet 2 and the shaft 3 are integrally formed by inserting an elastic insulating supporting material 4 such as a resin having low rigidity or rubber. The molding method will be described hereinlater.

A rough part 3a such as patterned knurl is formed on the outer face of the shaft 3. When the elastic insulating supporting material 4 is inserted, the material 4 enters the rough part 3a, thereby obtaining proper connecting strength between the shaft 3 and the material 4. The width of the knurl is in a range slightly shorter than the width in the axial direction of the magnet 2 so that the elastic insulating supporting material 4 is not loosened by a change in rotational force of the rotor or internal temperature, impact in the axial direction of the rotor, or the like.

The connection between the magnet 2 and the material 4 is properly kept by chamfers 2a formed on both sides of the inner face of the magnet 2 and a plurality of dents 2b formed on at least one of the chambers 2a.

The chambers 2a work effectively so as to prevent the magnet 2 from being come off in the axial direction and the dents 2b act to prevent the rotation of the magnet 2. Since the material 4 is used for molding by being heated and inserted, it is cooled and hardened after the molding. A compressive force acts in the joint face with the magnet 2 and that with the shaft 3, so that the faces are strongly jointed with the actions of the rough part 3a, chamfers 2a, and the plurality of dents 2b.

According to the invention, in order to obtain further sufficient effects of the elasticity of the elastic insulating supporting material 4, an almost H letter shape in cross section is made of the material 4, the magnet 2 and the shaft 3 are connected by a rib 1b as shown in FIG. 1, and spaces 1a are formed on both sides of the rib 1b.

In the spaces 1a, a plurality of radially extended ribs 1c which are integrally formed with the elastic material 4 are provided. The ribs 1c maintain the strength of the rotor 1 itself and also play a roll of blades, which are effective to agitate the internal space to decrease the internal temperature. In order to positively promote the agitating action, a small hole penetrating the rib 1b may be opened so that the air can be communicated in the axial direction, and the ribs 1c may be twisted so as to be effective as fans.

The rotor 1 is supported by ball bearings 5 fixed to the both ends of the shaft 3. The bearings 5 are housed in bearing housings 7a and 71a provided in the center of both of side walls of a pair of rear and front cylindrical casings 7, 71 surrounding the stator 6, respectively.

The cylindrical casings 7, 71 are made of a light member made of a non-magnetic material resin whose specific gravity lies within a range from 0.8 to 3 (for example, polybutyl terephthalate), and is divided into two right and left cups by the almost vertical center line in the axial dimension.

In the divided-half casing 71, a plurality of mounting flanges 71b extending toward the outside and a mounting boss 71c similarity extending toward the outside to assemble the other cylindrical divided-half casing 7 with a screw 8 are integrally formed. On the division face of the casing 71, a loop slot 71d is formed to receive a projection 7b of the cylindrical casing 7. Because of the engagement, a stress occurring on the division faces when the main body is fixed via the mounting flanges 71b is received by the casing 71 to minimize the opening of the divided faces. Simultaneously, by fitting the projection into the slot, the strength of the divided faces and sealing performance to prevent water invasion from the outside can be improved.

Figure 3:
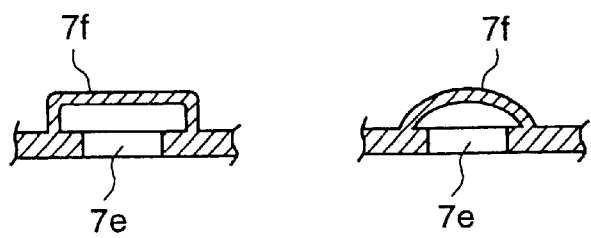
FIG. 3 is a cross section taken along the line III—III in FIG. 1 showing a drain hole part.

Drain holes 7e and 71e are opened on the lower contact faces of the cylindrical casings 7 and 71 in a state where the rotor is used. Labyrinth seal walls 7f and 71f for checking direct flood from the under face sides are provided around the drain holes 7e and 71e, respectively. A dome shape in cross section as shown in FIG. 3 is used for each of the labyrinth seal walls so as to function as an exhaust port for condensed water in the rotor and water entered from another part.

Figure 4:
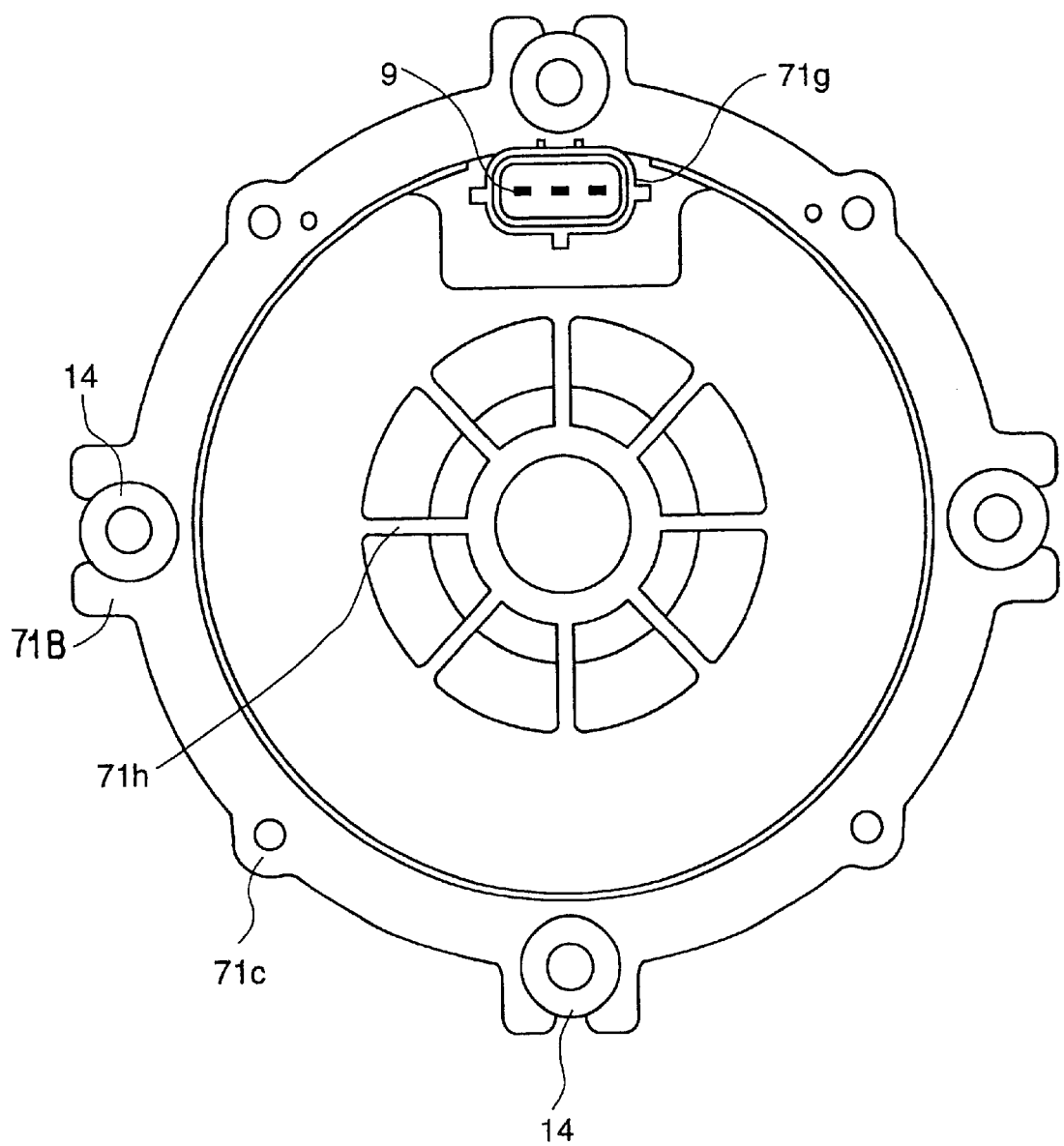
FIG. 4 is a side view of the right part of FIG. 1.

Consequently, with the fan effect of the rotor, the cylindrical casings 7 and 71 are always ventilated during rotation of the fan, and the water is not stored, so that the electrical insulation can be maintained. A cylindrical water-proof wall 7g surrounding the shaft 3 is formed on the outer surface of the bearing housing 7a of the casing 7 and the invasion of water from the outside to the bearing is prevented by a labyrinth effect obtained from the wall 7g and a propeller fan for making a blast which will be described hereinlater. Further, a plurality of input terminals 9 as shown in FIG. 4 are arranged in the upper part of the side wall in the state where the cylindrical casing 71 is mounted and are embedded and fixed simultaneously with formation of a connecting terminal unit 71g for external power supply.

Figure 6:
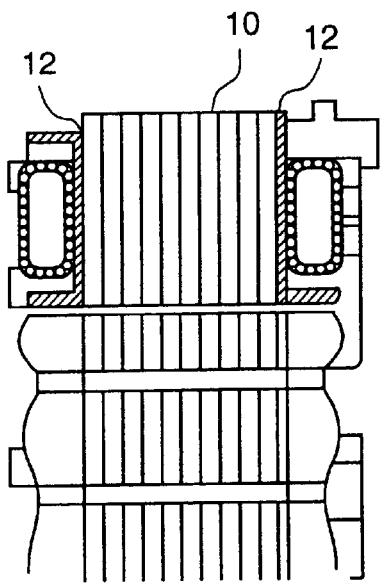
FIG. 6 is a cross section of a main part of FIG. 5.

The stator 6 comprises: a stator core 10 having a plurality of layers; a stator coil 11 which is wound around the stator core 10 and forms rotating magnetic fields; and an insulator 12 which has the same shape as that of the stator core 10 and electrically insulates the stator core from the coil. A plurality of wiring terminals 13 are embedded and fixed on one of the end faces of the insulator 12 (refer to FIGS. 6, 7, and 8).

The kind of insulator of the stator coil 11 having the softening temperature lower than the flashing temperatures of surrounding inflammable members such as the insulator 12 and the cylindrical casings 7 and 71 surrounding the insulator 12 is selected. Consequently, when heat is generated due to the coil abnormality as an inflammation source, the stator coil 11 is first disconnected, thereby preventing other combustible members from being influenced. Thus, it is unnecessary to especially provide a temperature fuse for detecting abnormal inflammation.

Figure 5:
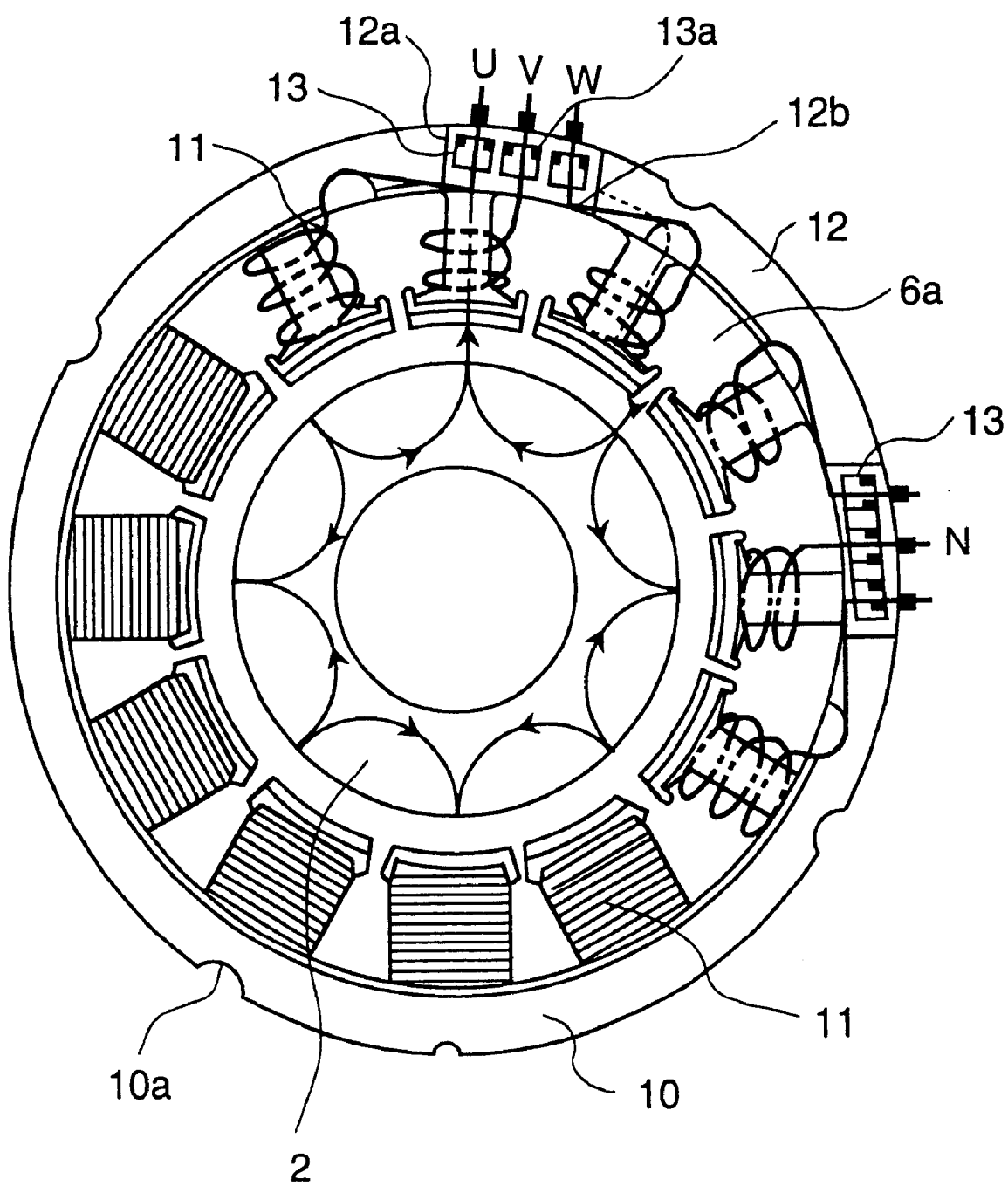
FIG. 5 is a side view showing magnetic circuits and a stator core around which coils are wound according to the embodiment.

A method of electrically connecting the stator coil 11 and the wiring terminal 13 will be described with reference to FIG. 5. FIG. 5 is a plan view showing a state where the stator coils 11 are wound at intervals of slots 6a. The embodiment relates to an example of a 3-phase and 12-slot stator coil. Terminal lines of 3 phases of U, V, and W are sandwiched and fixed by slits 13a of the wiring terminal 13 in the above-mentioned insulator 12. Notches 12b are formed in the insulator 12 around a cavity 12a housing the wiring terminal 13. The terminal lines are guided and connected to the wiring terminal 13 via the notches 12b.

Figure 7:
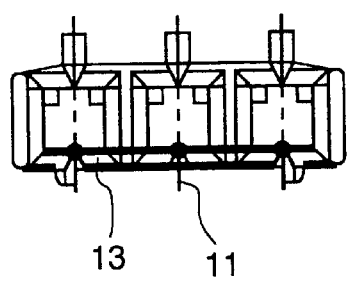
FIG. 7 is an enlarged front view of a wiring terminal shown in FIG. 1.

The wiring terminal at a neutral point N is intended to be commonly used as a 3-phase wiring terminal. The 3-phase wiring terminal uses separate connecting terminals. On the other hand, as shown in FIG. 7, the wiring terminal at the neutral point N is a series of three terminals in the same shape and it is unnecessary to bundle the terminal lines.

A method of assembling the rotor 1, stator 6, and cylindrical casings 7, 71 and connection to the input terminal 9 will be described.

FIG. 9 is a perspective view showing the assembling method of the parts.

Figure 10:
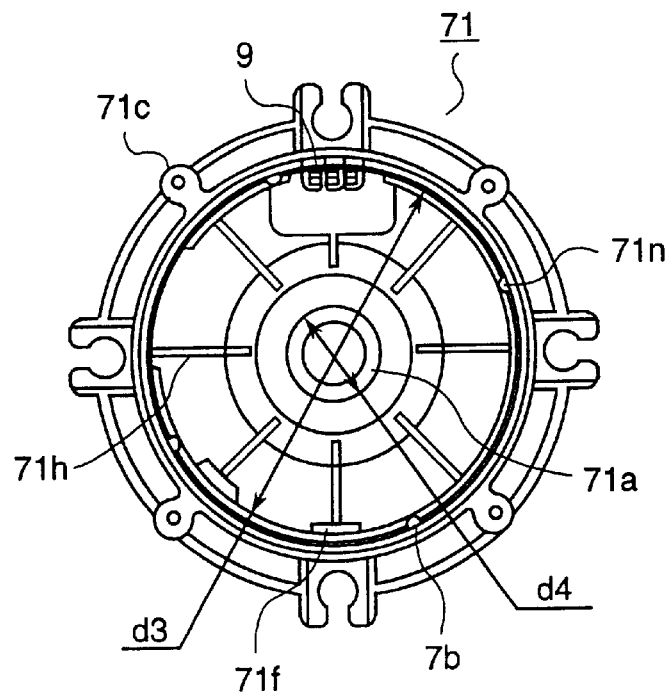
FIG. 10 is a cross section of FIG. 9(D)

A plurality of projected ribs 71n are provided on the inner end face of the cup-shaped casing 71 as shown in FIG. 10 and are fit into slots 10a (FIG. 9-C) opened on the periphery of the stator core 10, thereby performing the positioning in the rotational direction.

The inner diameter d3 of the cylindrical casings 7, 71 and the inner diameter d4 of the bearing housing 7a has a clearance fit relation satisfying the conditions of d3>d1 and d4>d2 when the temperature is 70° C. (which is obtained by adding a spare temperature of approximately 20° C. to the normal-use atmosphere upper limit) or higher, and has a tight fit relation satisfying the conditions of d3<d1 and d4<d2 when the temperature is lower than 70° C. The dimensional relations are obtained by using the coefficient of thermal expansion of the casing 7.

That is, at the time of the assembly, the casing 71 is heated for short time so as to be almost 70° C. or higher and the projected ribs 71n are inserted into the slots 10a of the stator core 10, thereby enabling the assembly to be more easily performed. In this case, the input terminals 9 extending from the inner end face of the casing 71 are simultaneously inserted into the wiring terminal 13 formed at the opposite end face of the insulator 12, so that the internal connection and the external power supply connection of the rotor can be automatically performed by a linear operation. Although the connecting terminal unit 9 for the external power supply is provided on the casing 71 side in the embodiment, similar effects can be also obtained when the terminal unit 9 is preliminarily provided on the cavity 12a side and only an external fitting shape of a connecting terminal unit 71g for external power supply is formed on the casing 71 side.

The other casing 7 is assembled in a manner similar to the above-mentioned hot insertion method. At least five radially extending stiffening ribs 7h and 71h are provided at equal intervals on the periphery of the bearing housings 7a and 71a of the casings 7, 71, respectively. The stiffening ribs 7h and 71h have functions of assuring the strength of the bearing housing 7a and keeping the diameter d4 a complete round when the bearing housing 7a is cooled and pressure welded to the bearing 5.

Since the loop slots 71d and the projections 7b which are engaged with each other are provided on the division faces as mentioned above, the casings 7 and 71 can be easily assembled by fitting the projections into the slots. After that, the casing 7 is completely fixed to the boss 71c of the casing 71 by using the plurality of screws 8. A vibration damping rubber 14 is finally attached to the plurality of mounting flanges 71b of the casing 71, thereby completing the assembly. Since the casings 7 and 71 are cooled by the time of the completion of the assembly, the bearings 5 of the stator 6 and the rotor 1 can keep the pressure welded state in both of the axial and radial directions even in the normal operation state.

Figure 11:
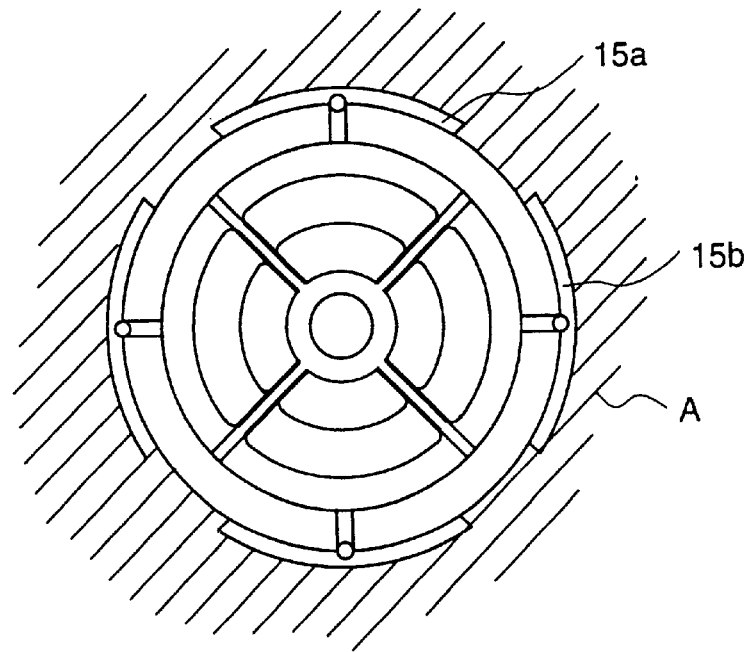
FIG. 11 is a cross section of a molding device of the rotor which is used in the invention.
Figure 12:
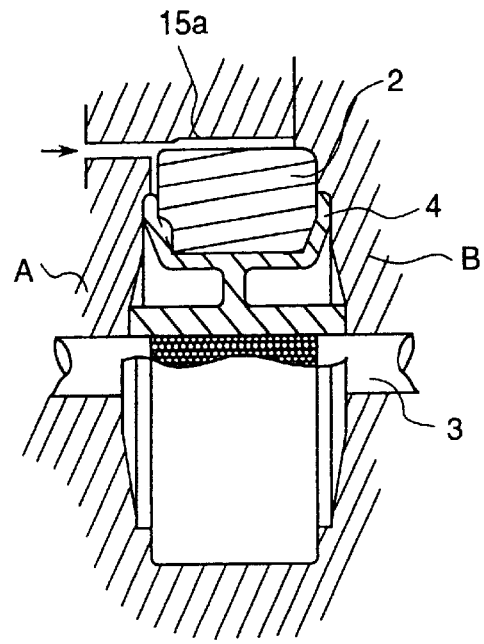
FIG. 12 is a cross section of the molding device of FIG. 11.

A method of molding the rotor 1 will be described. FIG. 11 is a cross section in the axial direction and FIG. 12 is a front view of the rotor 1 just formed. After the shaft 3 and the cylindrical multi-pole anisotropic magnet 2 are set in molds A and B, the elastic insulating supporting material 4 is heated and filled in the molds from the gates of the molding device by an injection or compression molding or the like. According to the invention, as shown in FIG. 11, runners 15a and 15b through which the material 4 runs are formed on the periphery and the both end faces of the magnet 2. Consequently, the internal stresses occurring by the injection pressure on the inner and outer faces of the magnet become almost the same, so that a damage such as air crack does not occur in the magnet 2 due to the stress upon molding.

Although the elastic insulating supporting material 4 which is filled in the runner 15a is removed in the embodiment of FIG. 1, the material 4 can be also left so as to cover at least a part or the whole outer face of the magnet. Thus, the magnet can be protected and prevented from being damaged by an unexpected accident caused by being hit or dropped in the assembling work or conveyance.

Figure 13:
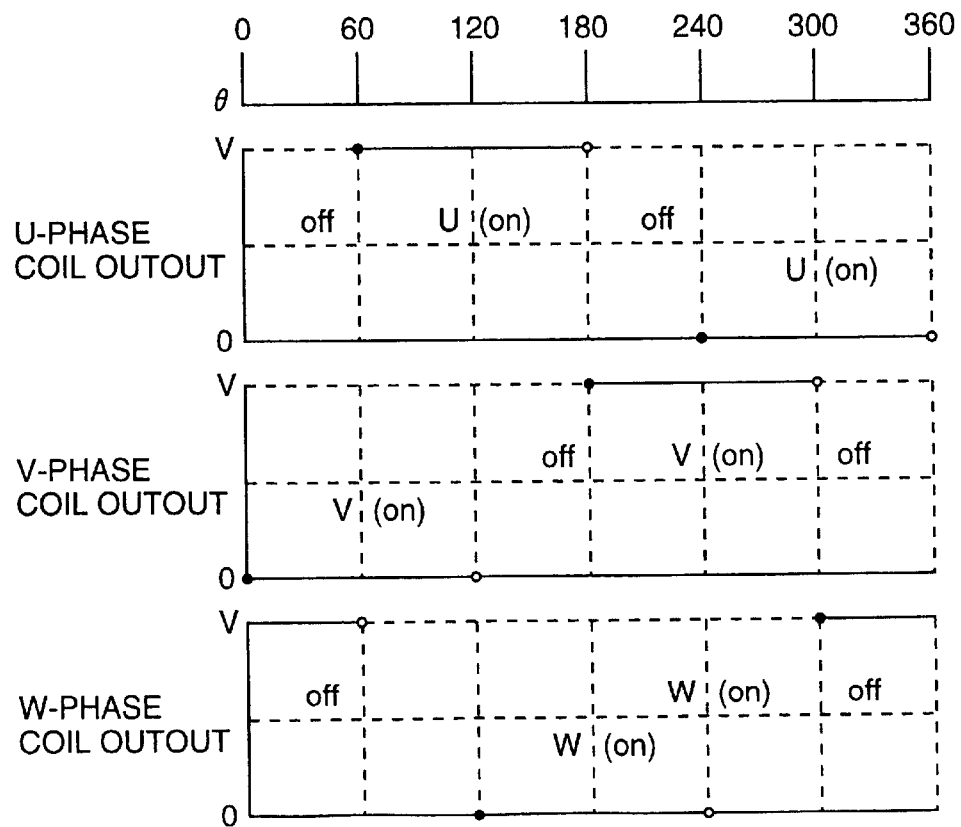
FIG. 13 is an output waveform chart of stator coils in the invention.
Figure 14:
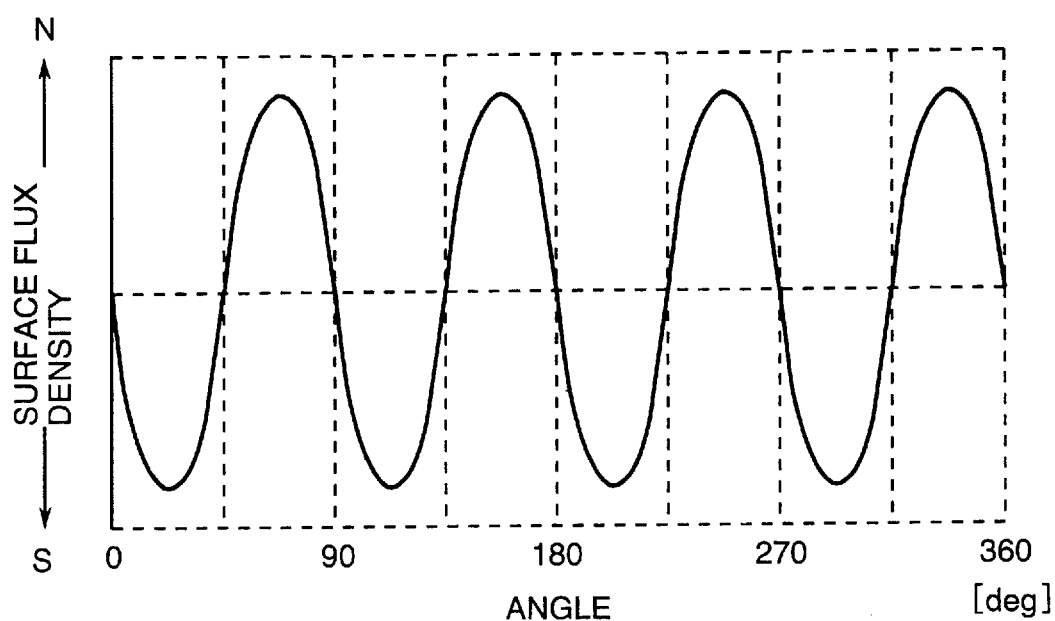
FIG. 14 is a waveform chart of a magnetic flux of the surface of a multi-pole anisotropic magnet which is used for the invention.

Realization of low vibration and high efficiency of the brushless motor of the invention will be described with reference to FIGS. 5, 13, and 14. FIG. 13 shows output waveforms forming rotational magnetic fields in the 3-phase stator coil 11 and outputs of the U, V, and W lines are operated at an electrical angle of 120° by an external control circuit (not shown). FIG. 5 shows a magnetic flux orientation model of the cylindrical multi-pole anisotropic magnet 2 which is used in the invention.

As shown by arrows in FIG. 5, in the multi-pole anisotropic magnet 2, the magnetic flux flows so as to form the closed magnetic circuit, so that it is unnecessary to form the closed magnetic circuit by using an inner stator core in the magnet which is necessary for a general radial anisotropic magnet. As shown in FIG. 14, because of the orientation characteristics, the surface magnetic flux waveform is smooth between the poles of the sine waves. It is therefore clear that the magnitude of a cogging torque due to the magnetic flux change acting between the stator 6 and the rotor 1 on the basis of the commutation period of the electrical angle of 120° can be largely reduced by using the multi-pole anisotropic magnet.

Further, the heavier that weight of the rotor is, combined with the inertia force, the fluctuation range of the vibration acceleration in the rotor due to the cogging torque becomes large. According to the invention, the multi-pole anisotropic magnet 2 is not divided by the poles but is formed in a properly thick ring-shaped column. Further, the magnet and the shaft are integrally formed by the elastic molding member, thereby reducing the weight and the cogging torque while taking advantages of the orientation characteristics without loosing the elasticity with necessary minimum strength.

According to the invention, it is verified that the efficiency is raised by approximately 5% as compared with a case where the outer diameter of the rotor is the same and the same specification of the stator is used. As mentioned above, any light member such as a resin or aluminum which is a non-magnetic material having the specific gravity from 0.8 to 3 can be arbitrarily selected for the cylindrical casing 7 and also the construction of the components of the invention is simplified, so that the weight of the motor can be reduced about 30% as compared with the conventional one.

Although the construction is described in the embodiment of the brushless motor in the invention, it will be obviously understood that the lightness and low-vibration effects can be similarly obtained by a DC motor with a brush, as an another embodiment, in which the cylindrical multi-pole anisotropic magnet 2 is arranged on the stator side and the rotor 1 is provided in the concentrical inner circumference of the magnet as shown in FIG. 9. In this case, the cylindrical multi-pole anisotropic magnet 2 and the cylindrical casing for housing the magnet 2 are integrally molded by the injection molding which is used for molding with a resin or the like in a manner similar to the above.

With such a construction, an iron yoke as a magnetic runner forming means around the magnet which is needed by the motor with brush becomes unnecessary, reduction in costs and large reduction in weight can be achieved.

Sealing performance against wind, rain, dusts, and the like from the outside and the fan vibration absorbing structure in a state where the brushless motor of the invention is used will be described in detail.

Figure 15:
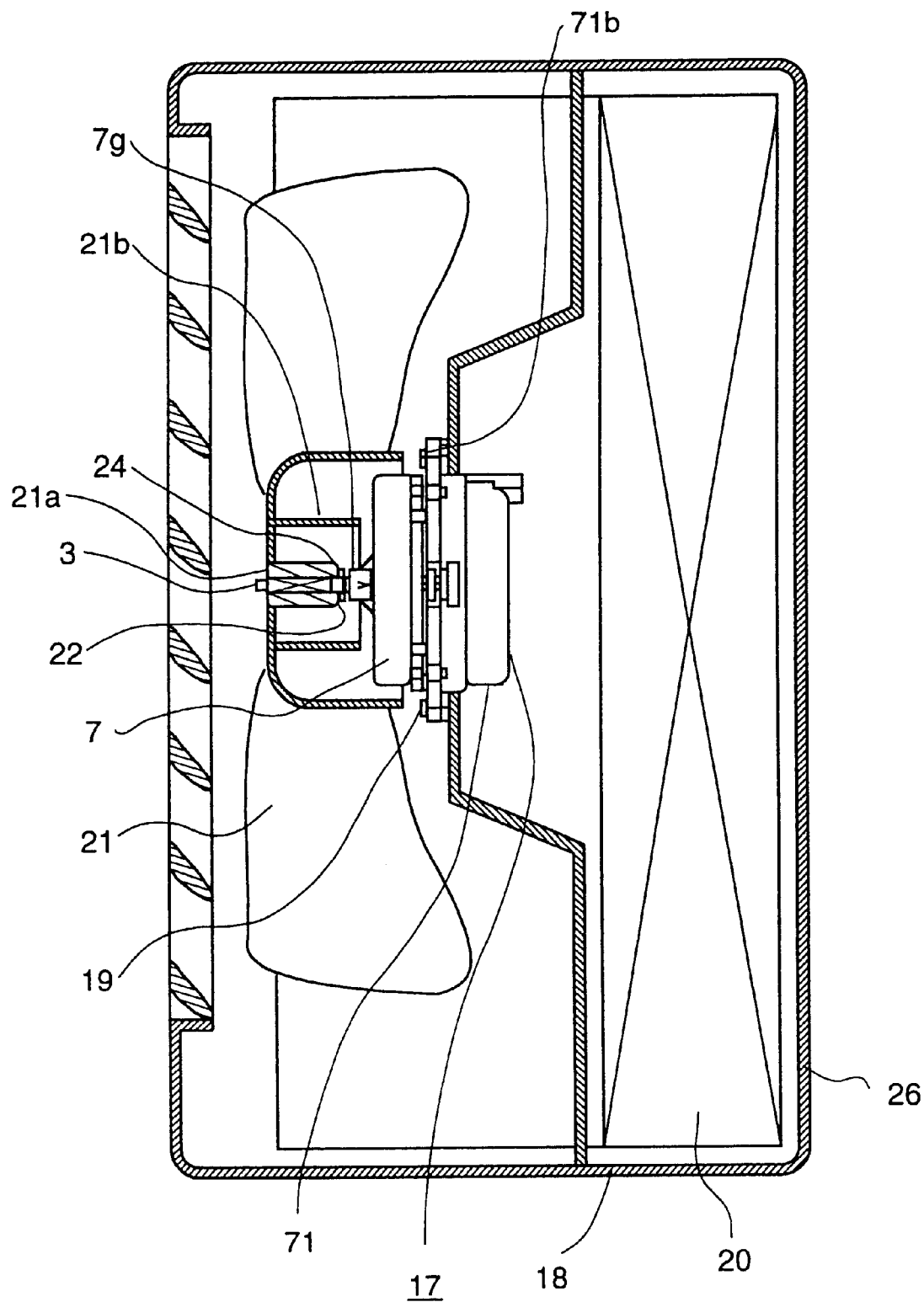
FIG. 15 is a diagram illustrating a mounting state when the invention is applied to a condenser unit of a room air conditioner.
Figure 17:
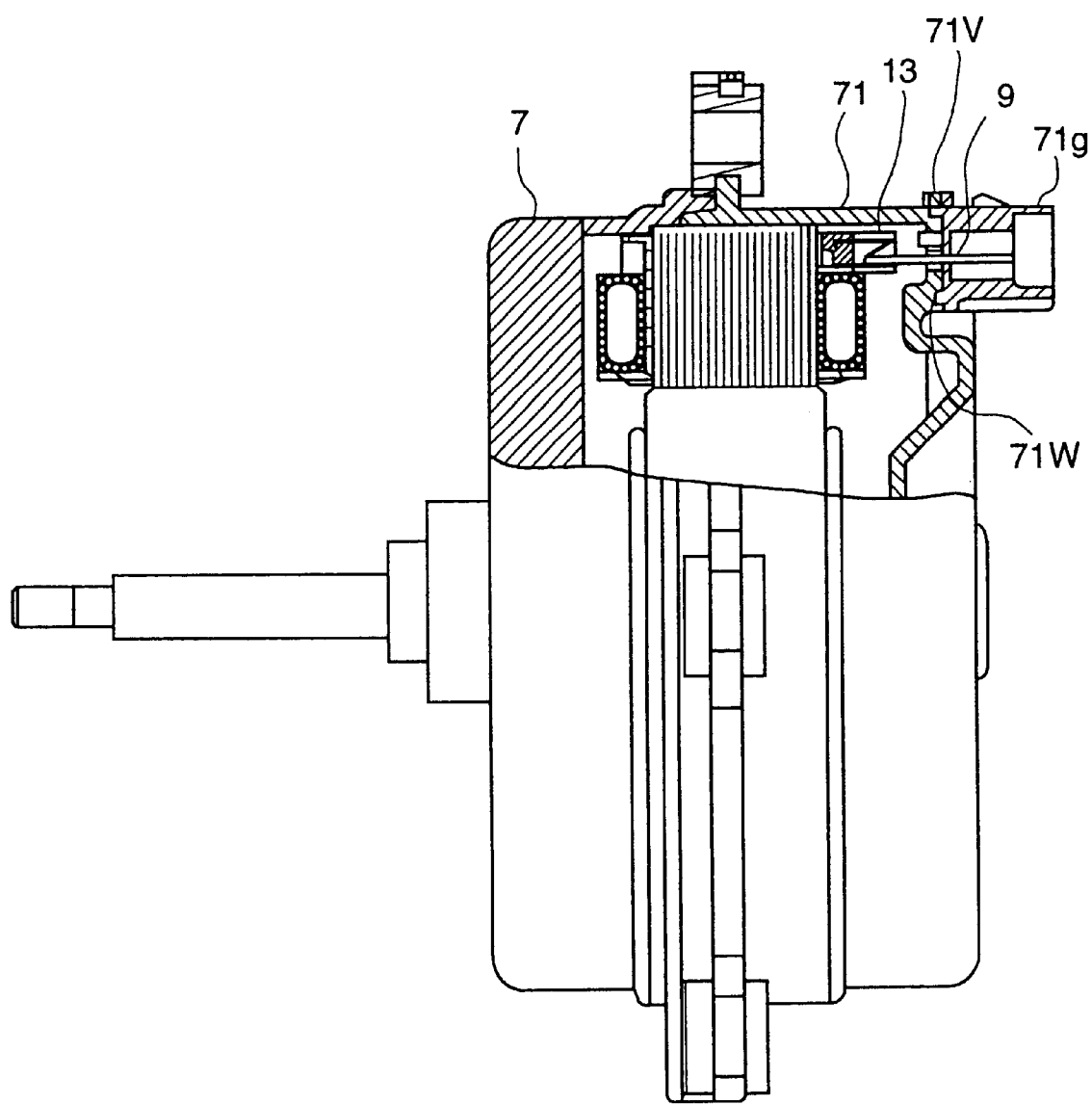
FIG. 17 is a cross section of a main part of a motor according to another embodiment.

FIG. 15 is a cross section of a brushless motor 17 of the invention mounted in a condenser unit 18 of a room air conditioner.

The brushless motor 17 is fixed to a mounting stay in the unit 18 by screwing the mounting flange 71b on the front side of a U-shaped condenser 20 with a plurality of fixing screws 19. A propeller fan 21 for sending air by the rotation of the shaft 3 is attached at the tip of the shaft 3 of the brushless motor 17. The boss 21a of the fan 21 is attached via a bearing surface formed by an E type retaining ring 22 attached to the shaft 3 near the front end of the cylindrical labyrinth seal wall 7g surrounding the shaft 3, a plain washer 23, and a vibration damping rubber washer 24 and is fastened and fixed by a nut 25.

The propeller fan 21 having the fan diameter which is generally larger than the outer diameter of the motor is often mounted without using the plain washer 23 and the vibration damping rubber washer 24 shown in the invention. In this case, however, since resonant sound is generated at a rotational speed corresponding to a vibration peculiar value of the fan when the fan is rotated, techniques such that the elastic insulating supporting body 4 is made of a low rigidity material such as a rubber and a vibration damping material, and further, the rotational speed upon using the fan is set out of a range of the resonant rotational speed are necessary.

According to the invention, in order to use the most of the effects of the simplification of the structure and reduction in vibration and to use the rotational speed in a wide range without restricting the range, the vibration damping rubber washer 24 in a small disk shape which directly damps the vibration of the fan 21 at the resonance rotational speed is attached to the fan boss 21a with a proper compression pressure. Although the E retaining ring 22 and the plain washer 23 are provided for maintaining the right angle between the rubber washer and the shaft 3, if the fitting part of the shaft and the fan are formed with a step and a sufficient bearing surface is assured, the E retaining ring 22 and/or the plain washer 23 can be removed. Further, it is obviously understood that the vibration damping effect upon resonance is enhanced when the vibration damping rubber washer 24 is similarly added to the nut 25 side of the fan boss 21a.

The whole condenser unit 18 of the room air conditioner is covered by a casing 26 having an opening window with a plurality of slits made of a resin or iron plate. Since the condenser unit 18 is often installed outside, it is exposed to the dusts, rain, and winds. Since heat from the condenser is exhausted by the rotation of the propeller fan 21, the brushless motor 17 always receives splashed water drops of condensed water or the like from the condenser 20 during the rotation. In order to improve the sealing performance against the dusts, winds, rain, and water drops, the casings 7, 71 of the brushless motor 17 have the loop slot 71d, projection 7b which is inserted into the loop slot 71d, drain holes 7e and 71e from which the water inside the motor is escaped, and labyrinth seal walls 7f and 71f which are intended to prevent direct invasion of water such as splashed water from the unit. The cylindrical labyrinth seal wall 71 surrounding the shaft 3 is positioned so as to be lapped with the circular rib 21b arranged on the inner side of the fan boss 21a. The invasion of water and dusts from the outside to the bearing 5 is prevented by the labyrinth effect.

Figure 16:
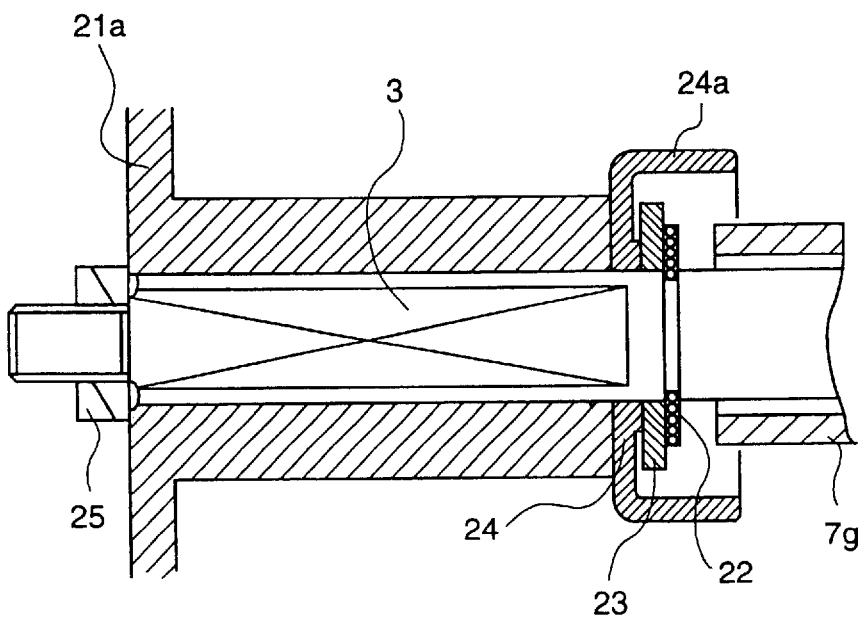
FIG. 16 is an enlarged diagram of a main part of the another embodiment of FIG. 15.

FIG. 16 shows another embodiment using the propeller fan 21 having no circular rib 21b in FIG. 15. A cylindrical flange 24a having the diameter larger than that of the shaft is formed at the outer periphery of the vibration damping rubber washer 24. A proper gap is formed between the flange 24a and the cylindrical labyrinth seal wall 7g formed near the shaft hole in the center of the outer face of the casing. By arranging the flange 24a and the labyrinth seal wall 7g so as to be overlapped, water coming along the exposed surface of the shaft and entering the rotor is checked. Thus, there are characteristics that the water prevention and the vibration damping effects can be simultaneously obtained.

There is occasionally a case that the electromagnetic noises radiated from the surface of the rotor on the basis of the control frequency of the rotor exert an influence to another electric appliance mounted near the condenser unit or room air conditioner.

In such a case as well, since the casing of the invention can be made of a resin, general coating or filling of a coating material having main component such as acryl or urethane and nickel for shielding electromagnetic noises can be applied on the surface, so that the electromagnetic noises can be easily prevented without changing the construction.

Figure 18:
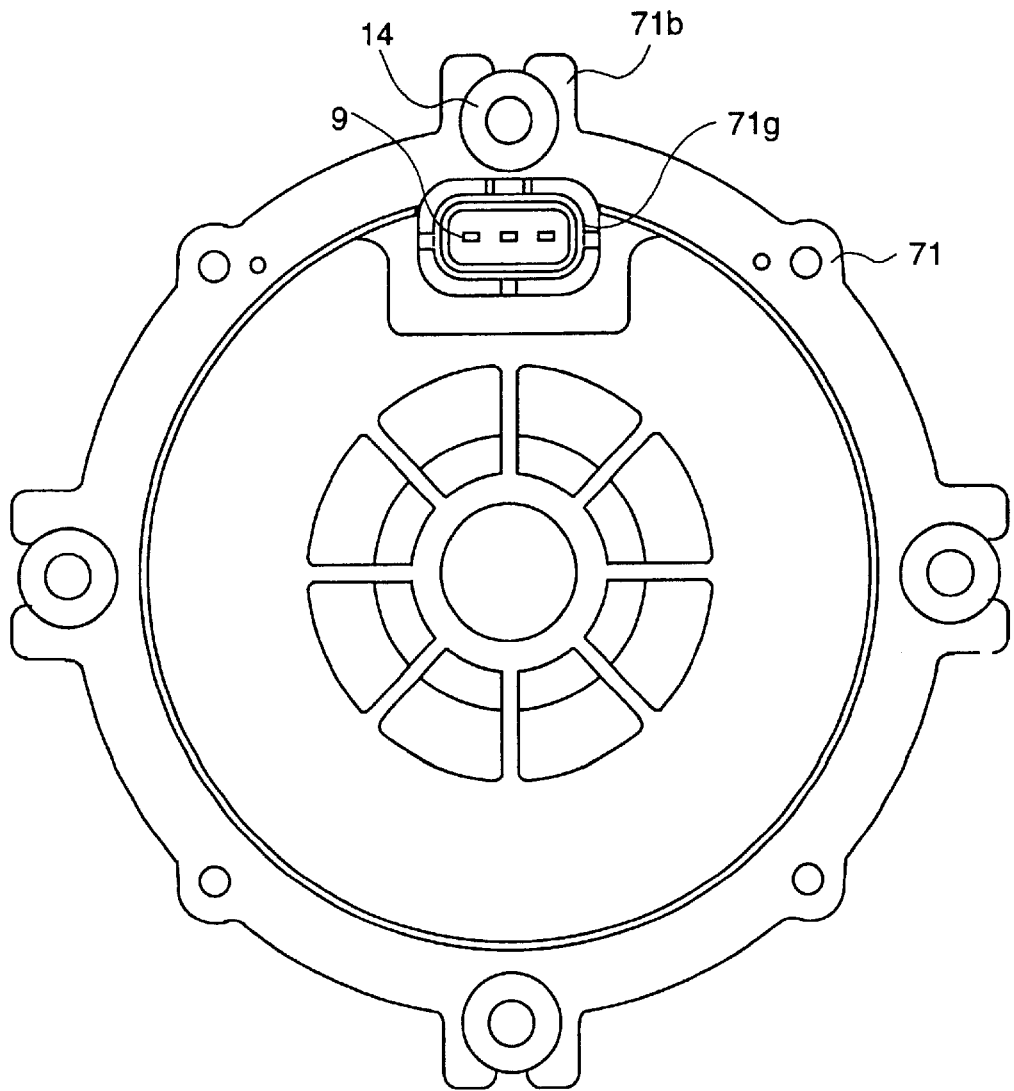
FIG. 18 is a side view of FIG. 17.
Figure 19:
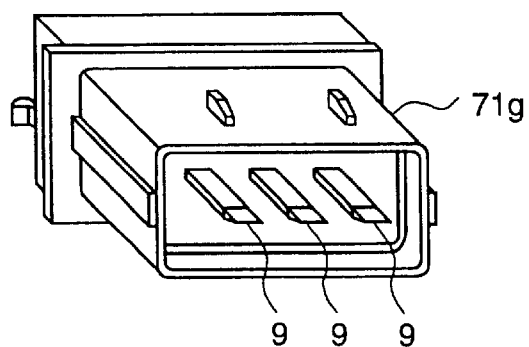
FIG. 19 is a perspective view of a connector which is used in FIG. 18.
Figure 20:
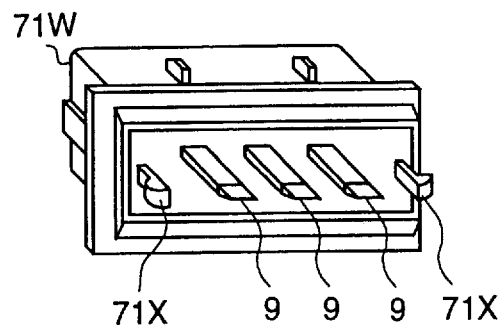
FIGS. 20 to 22 are perspective views of connectors according to other embodiments.
Figure 21:
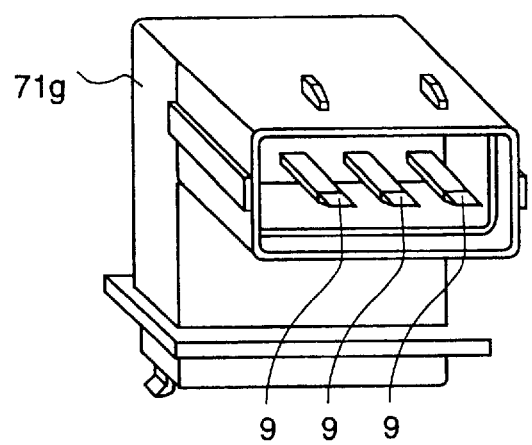
Figure 22:
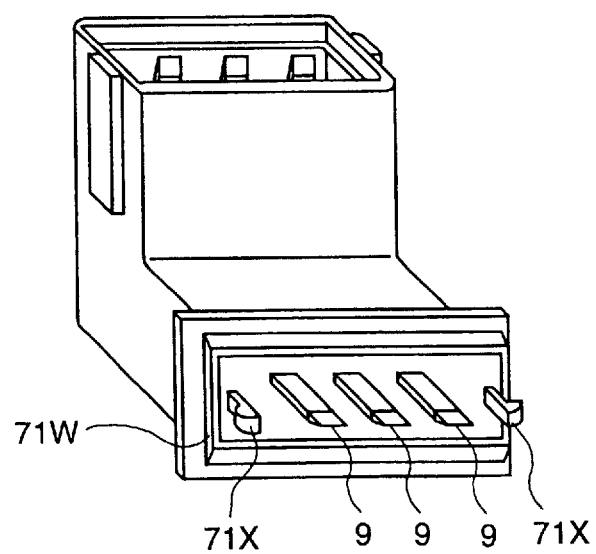

FIGS. 17 to 22 show another embodiment of the connecting terminal unit 71g for external power supply. A separate connecting terminal unit 71g is attached onto a side wall on the top face side of the casing 71 in a one touch manner. A plurality of input terminals 9 are arranged and fixed to the connecting terminal unit 71g. The input terminals 9 are electrically connected to a plurality of wiring terminals 13 of the stator 6. The rear elevation of the rotor is shown in FIG. 18.

Interlocking parts 71v are formed in parts of the casing 71, to which the connecting terminal unit 71g is attached, and the connecting terminal unit 71g has projections 71w. The interlocking parts 71v and the projections 71w have convex and concave shapes which fit each other. The detailed construction of the connecting terminal unit 71g will be described hereinlater with reference to FIGS. 19 and 20. By retaining retaining nails formed in the connecting terminal unit 71g are retained by the inner wall on the top face side of the casing 71, the connecting terminal unit 71g is attached in a one touch manner. The shape of each retaining nail will be also described hereinlater by using FIG. 20.

When a partner side connector is inserted into the connecting terminal unit 71g, the pulling or pushing force, prying force, and the like are applied on the division faces of the connecting terminal unit 71g and the casing 71. However, the division faces of the connecting terminal unit 71g and the casing 71 also have the convex and concave engagement structure in a manner similar to the division faces of the casing 7. Consequently, the strength of the division faces, and the water sealing performance and dust tightness are improved. Since the connecting terminal unit 71g is constructed separately from the rotor main body, whether the terminal is detached in the axial direction of the rotor or in the vertical direction can be arbitrarily changed only by replacing the kind of the connecting terminal unit without changing the rotor main body.

Figure 23A:
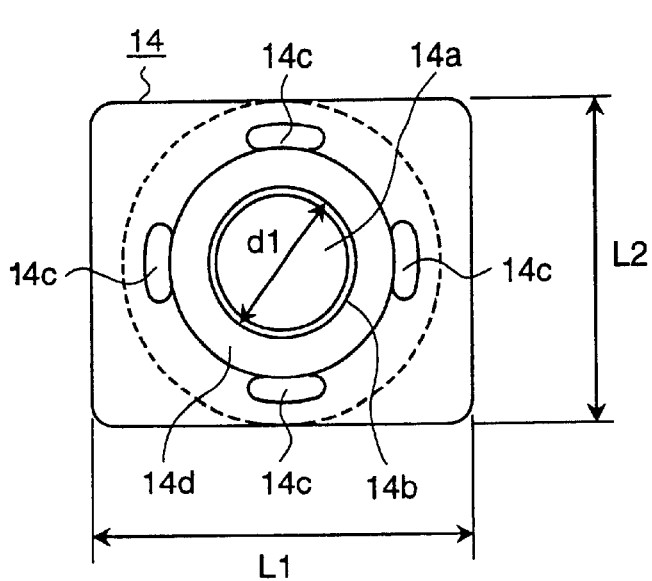
FIGS. 23(A) and 23(B) show a plan view and a cross section of an embodiment of a vibration damping member, respectively.
Figure 23B:
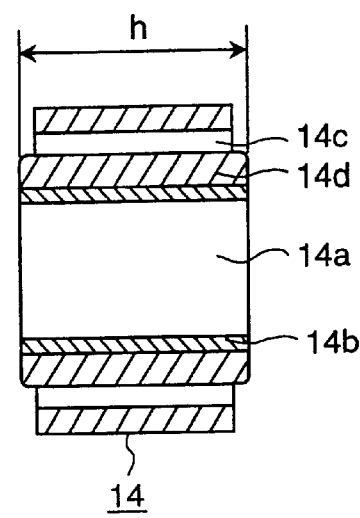

FIG. 23 illustrates the shape of the vibration damping member 14 in the another embodiment.

The vibration damping member 14 is made of a material having elasticity such as rubber or elastomer and a vibration absorbing member molded by the injection or pressure molding. A thin-walled circular tube 14b made of a metal as a separate member is arranged on the inner side of the vibration damping member 14. A through hole 14a for a screw by which the motor is attached to a component is formed on the inner side of the thin tube 14b.

The compression interference of the vibration damping member 14 is determined by the height (h) of the thin-walled tube 14b. The thin-walled tube 14b prevents the vibration damping member 14 from being twisted in the rotational direction and hardened by a screw fastening torque. Consequently, even if the magnitude of the screw fastening torque varies as in the conventional technique, the compression interference of the vibration damping member 14 can be made constant and the vibration damping member 14 is not easily hardened. Since the vibration suppression interference can be consequently increased, even in the brushless motor in which the motor mass is lightened within about five times of the fan mass, the vibration suppressing effect is strong even for the cogging torque reaction caused by the commutation frequency of the drive, and the vibration damping effect is not deteriorated.

Further, a plurality of through slots 14c are formed in almost the center of a thick-wall which is on the outer side of the position into which the thin-wall tube 14b of the vibration damping member 14 is inserted. The through slots 14c are formed at positions which correspond to the outside diameter d1 of the fastening screw or positions than the outside diameter d1. By forming the plurality of through slots 14c, even if the vibration damping member 16 on the undersurface of the screw is hardened, the hardness of the vibration damping member 14 which is on the outer side of the outside diameter of the screw is not influenced. The through slots 14c also prevent deformation. In this case, small holes can replace the through slots 14c. That is, through holes such as the through slots 14c and small holes in the embodiment penetrate the vibration damping member 14 in the screw inserting direction and can be formed in any positions as long as they are on the outer side of the outside diameter of the screw.

The outward form of the vibration damping member 16 is a rectangle having the long side L1 in the motor rotating direction and the short side L2 in the attaching direction of the vibration damping member 16 as the radial direction of the motor. Consequently, the face vibration damping ratio is assured, the mounting dimension is reduced, and the assembling work is facilitated. The larger the outward form of the vibration damping member is, the higher the face vibration damping ratio is. However, since that of the conventional technique has a slit shape, the face vibration damping ratio is low. On the contrary, according to the embodiment, the face vibration damping ratio can be increased. When the outward form of a general round vibration damping member which has been known conventionally is enlarged, although the face vibration damping ratio can be increased, the mounting dimension of the motor is enlarged and the work efficiency of attaching the vibration damping member to the motor deteriorates. On the contrary, according to the invention, the face vibration damping ratio can be increased by using the small vibration damping member and the work efficiency is also improved. Further, since the outer form of the vibration damping member 16 is a rectangle, as compared with a conventional case of forming the outer form in an open shape like a gear, it is unnecessary to remove burrs after molding, there is no limitation of a multi-cavity mold, and the mold is not complicated, so that the motor can be cheaply produced.

Further, according to the invention, in order to minimize the influence of the hardening on the inner circumference side of the vibration damping member 16 by fastening the screw, the vibration damping member around the thin-walled circular tube 16b arranged in the center part has the same height (h) as that of the thin-walled circular tube and the step 16d which is lower than the height (h) is formed. In place of the step 16d, a vibration damping member having a drum face can be also used. By using the shape, the motor is held while increasing the compression ratio of only the undersurface of the fixing screw of the motor and the other parts including the plurality of through slots 16c can certainly act as vibration absorbers.

According to the invention as mentioned above, all of providing a cheap rotor by reducing the weight, lowering the vibration, and simplifying the structure, improvement in environment-resisting seal performance, assurance of reliability when the internal abnormal heat generation occurs, high-efficiency, and the like, which are incompatible and clearly exist but are conventionally achieved only one by one, can be achieved.

What is claimed is:

1. A permanent-magnet brushless motor comprising:
    a rotor having a rotating magnetic pole formed by a cylindrical multi-pole anisotropic magnet fixedly coupled and integrally molded to a shaft by means of insert molding of an integrally formed elastic insulating supporting member made of an electrically insulated material which has a rigidity which is lower than at least a rigidity of the shaft; and
    a cylindrical casing having a stator core mounted therein; wherein,
    said cylindrical casing is made of a resin;
    a stator coil wound around the stator core is of a coil insulating kind, and has a flash point temperature that is lower than a flash point temperature of an insulating resin member provided between a lowest layer of the coil and the stator core, and lower than a flash point temperature of the cylindrical resin casing; and
    said rotor shaft has an irregularly contoured circumferentially disposed surface area on which said rotating magnetic pole is integrally molded.

2. A permanent-magnet brushless motor comprising:
    a rotor having a rotating magnetic pole formed by a cylindrical multi-pole anisotropic magnet fixedly coupled and integrally molded to a shaft by means of insert molding of an integrally formed elastic insulating supporting member made of an electrically insulated material which has a rigidity which is lower than at least a rigidity of the shaft; and
    a cylindrical casing having a stator core mounted therein; wherein,
    said cylindrical casing is made of a resin; and
    a stator coil wound around the stator core is of a coil insulating kind, and has a flash point temperature that is lower than a flash point temperature of an insulating resin member provided between a lowest layer of the coil and the stator core, and lower than a flash point temperature of the cylindrical resin casing.

3. The motor according to claim 2, wherein the cylindrical casing comprises two divided cup-shaped synthetic resin members which are fixed so as to face each other while sandwiching the stator core.

4. The motor according to claim 3, wherein the cylindrical casing is made of a non-magnetic material having the specific gravity ranging from 0.8 to 3.

5. The motor according to claim 3, wherein the cylindrical casing includes a material which suppresses electromagnetically radiated noises generated during operation on the basis of a rotational control frequency.

6. The motor according to claim 3, wherein:
    the cylindrical casing is divided into two divided parts by a plane which is substantially perpendicular to an axial dimension of the rotor;
    a mounting flange for a rotor and a boss to be attached to one divided part of the casing are integrally formed in the other divided part of the casing;
    a loop slot is formed on division faces of one of the divided parts;
    a projection is formed on a division face of the other divided part; and
    the loop slot and the projection are fit with each other and connected.

7. The motor according to claim 6, wherein the rotor mounting flange has a vibration damping member which comprises a thin-walled circular tube arranged in a center part, and a vibration absorbing member which is closely attached to the thin-walled circular tube and has a plurality of through holes extending in the axial direction on an outer periphery of the damping member.

8. The motor according to claim 2, wherein a lead wire of the stator coil is collected at a wiring terminal fixed to an end face of the stator coil and is led to the outside.

* * * * *